US006880893B1

(12) United States Patent
Scotton

(10) Patent No.: US 6,880,893 B1
(45) Date of Patent: Apr. 19, 2005

(54) ADJUSTABLE SEAT BELT REROUTER SYSTEM

(75) Inventor: Kevin Curtis Scotton, Aberdeen, NC (US)

(73) Assignee: McMurray Fabrics, Inc., Aberdeen, NC (US)

( * ) Notice: Subject to any disclaimer, the term of this patent is extended or adjusted under 35 U.S.C. 154(b) by 0 days.

(21) Appl. No.: 10/408,479

(22) Filed: Apr. 7, 2003

Related U.S. Application Data

(60) Provisional application No. 60/370,202, filed on Apr. 5, 2002.

(51) Int. Cl.[7] .............................................. A47C 31/00
(52) U.S. Cl. ........................ 297/485; 297/468; 297/483; 280/808
(58) Field of Search ................................ 297/483, 482, 297/485, 474, 478, 468, 475; 280/808

(56) References Cited

U.S. PATENT DOCUMENTS

| | | | | |
|---|---|---|---|---|
| 3,482,872 | A | * | 12/1969 | Chamberlain ................ 297/472 |
| 3,950,826 | A | * | 4/1976 | Knoll et al. .................... 24/171 |
| 4,156,574 | A | | 5/1979 | Boden |
| 4,288,891 | A | | 9/1981 | Boden |
| 4,451,060 | A | * | 5/1984 | Sylven ..................... 280/801.1 |
| 4,648,625 | A | * | 3/1987 | Lynch ......................... 280/808 |
| 5,026,225 | A | * | 6/1991 | McIntyre ...................... 410/23 |
| 5,080,396 | A | * | 1/1992 | Vacanti ........................ 280/808 |
| 5,308,116 | A | * | 5/1994 | Zawisa et al. ............... 280/808 |
| 5,340,198 | A | | 8/1994 | Murphy et al. |
| 5,345,656 | A | * | 9/1994 | Merritt ...................... 24/115 H |
| 5,421,614 | A | | 6/1995 | Zheng |
| 5,495,646 | A | | 3/1996 | Scrutchfield et al. |
| 5,609,367 | A | | 3/1997 | Eusebi et al. |
| 5,653,003 | A | | 8/1997 | Freeman |
| 5,797,654 | A | | 8/1998 | Stroud |
| 5,839,792 | A | * | 11/1998 | Baik .......................... 297/483 |
| 5,897,169 | A | | 4/1999 | Larsen et al. |
| 6,033,030 | A | | 3/2000 | Valasin |
| 6,142,575 | A | | 11/2000 | Patterson |
| 6,293,589 | B1 | | 9/2001 | MacDonald et al. |
| 6,325,417 | B1 | | 12/2001 | Lake |
| 6,336,261 | B1 | * | 1/2002 | Yamamoto .................... 24/687 |
| RE37,942 | E | * | 12/2002 | Glendon ..................... 280/808 |
| 6,543,722 | B1 | * | 4/2003 | Parrow et al. ........... 244/122 R |

* cited by examiner

*Primary Examiner*—Milton Nelson, Jr.
*Assistant Examiner*—Sarah C. Burnham
(74) *Attorney, Agent, or Firm*—Kilpatrick Stockton LLP

(57) ABSTRACT

An adjustable seat belt rerouter system includes a cord, a cord length adjustment mechanism, and a shoulder belt guide. The shoulder belt guide is slidingly connectable to the shoulder belt. The seat belt rerouter system includes a means for attaching a first end of the cord to the shoulder belt guide and a means for attaching a second end of the cord to a vehicle attachment point. When the cord first end is attached to the shoulder belt guide and the cord second end is attached to the vehicle attachment point, the cord length is adjustable with the cord length adjustment mechanism for rerouting and holding the shoulder belt away from a vehicle occupant's neck and face.

31 Claims, 5 Drawing Sheets

ADJUSTABLE SEAT BELT REROUTER SYSTEM

CROSS-REFERENCE TO RELATED APPLICATIONS

This application claims priority to U.S. Provisional Patent Application No. 60/370,202, filed Apr. 5, 2002, which is incorporated by reference herein in its entirety.

FIELD OF THE INVENTION

The present invention relates to vehicle seat belts and more particularly to a system for adjustably rerouting the shoulder belt of a three-point attachment seat belt.

BACKGROUND OF THE INVENTION

Motor vehicles are currently required to be equipped with seat belt assemblies for the protection of vehicle occupants in the event of sudden stops or impact of the vehicle with another vehicle or other object. Conventional vehicle seat belts are normally provided with one seat belt length attached at one end to a retracting device positioned on the body of the vehicle at the side of the seat. The opposite end of the belt is attached to a side of the vehicle at or above shoulder level. In another arrangement, for example, in a vehicle rear seat, the retracting device is positioned at or above shoulder level and the opposite end of the belt is attached to the vehicle body at the side of the seat. The seat belt has a latch plate slidably positioned along the belt.

To use the seat belt, an individual pulls the latch plate and fastens the latch plate to a buckle secured to the vehicle body at the side of or through the seat, thus providing a conventional three-point seat belt attachment. Such a three-point seat belt attachment arrangement is commonly known as a Type II auto restraint system. When pulled, the latch plate divides the length of seat belt into two belt portions, a lap belt portion and a shoulder belt portion. The lap belt portion lies across the lap, or waist, of the vehicle occupant. The shoulder belt portion routes across the chest and shoulder portion of the vehicle occupant when the belt is properly fastened. The shoulder belt crosses the vehicle seat, and hence the body of the occupant seated thereon, at a location which is fixed in relation to the seat, rather than the occupant.

Conventional vehicle seat belts are well-adapted for use with adults of average height. However, these conventional seat belts are not well suited for individuals who are very short, including, for example, children who have out-grown conventional child restraining devices. When a conventional seat belt is fastened in place about a child or a short adult, the shoulder belt will typically extend across the person's neck, face, or both because his or her upper body is not as tall as that of an average size adult.

A shoulder belt which normally routes across a child's neck or face is very annoying, uncomfortable, and dangerous. Because the shoulder belt is annoying and uncomfortable, it discourages use of the seat belt. To avoid the undesirably routed shoulder belt, a child may wear the seat belt improperly by placing the shoulder belt behind his or her back so that it does not interfere with his or her face. This defeats the purpose of a shoulder belt because the child's upper body and head may be thrown forward in an accident. Even average size or larger adults sometimes find the positioning of shoulder belts or the constant contact of shoulder belts with their chest and shoulder, to be uncomfortable and annoying. As a result, many people of all sizes may neglect to use a seat belt, reroute the shoulder belt behind their body, or otherwise obstruct or entirely defeat the safety objectives of the seat belt. Moreover, a shoulder belt routed across a vehicle occupant's neck can be dangerous in the event of a collision or sudden stop.

Some devices have previously been proposed in an attempt to reroute a shoulder belt away from a vehicle occupant's face and/or neck, but such devices present several disadvantages. Some of these devices are not adjustable by the occupant and do not adequately secure the shoulder belt in a desired position. Once installed, many of these devices cannot be easily removed from the shoulder belt and/or from another attachment point, such as a side panel of the vehicle, and thus cannot be easily used with different vehicles. Other devices include parts that wear out and are not replaceable.

One such device includes a seat belt adjustment band that can be placed around both a lap belt portion and shoulder belt portion in order to adjust the position of the shoulder belt portion with respect to the user. Although this adjustment band is capable of repositioning the location of the shoulder belt portion, the rerouted position is often only temporary because the adjustment band easily becomes displaced from its originally set position, allowing the shoulder belt to return to its former, uncomfortable position.

Another approach to rerouting a shoulder belt includes an additional belt mounted near the seat and a deflection member, which is adjustably mounted on the additional belt. The shoulder belt may be adjusted by the deflection member so as to cross the occupant's chest in a more desired position. Such an approach disadvantageously requires two additional pieces of equipment to be installed. Another approach to rerouting the point at which a shoulder belt crosses over a vehicle occupant's torso is mounting a D-ring to the interior side of vehicle body near the occupant's shoulder level. Such vehicle modifications are expensive and cumbersome and are not removable for storage when not in use.

Accordingly, there is a need for an improved means for rerouting a seat belt. There is a need to provide a system for rerouting the shoulder belt portion of a seat belt away form an vehicle occupant's face and/or neck over the occupant's chest and shoulder that is fully adjustable for different size occupants.

There is a need to provide an adjustable device which is adaptable for use with a conventional three-point seat belt for rerouting the position of a shoulder belt so that it does not interfere with a child's face and/or neck, and which encourages a child to use his or her seat belt properly so that the full safety benefits of a Type II vehicle restraint can be realized.

There is a need to provide a shoulder belt adjustment device that maintains its position once it is adjusted to a desired lateral location in a three-point seat belt system.

There is also a need to provide a seat belt rerouter system that is simple to install and use and that is removable from the seat belt such that the entire assembly can be stored in a non-visible location when not in use.

SUMMARY OF THE INVENTION

The present invention provides an adjustable seat belt rerouter system advantageous for adjustably rerouting a shoulder belt safely and comfortably away from a vehicle occupant's neck and face. In an embodiment of the present invention, an adjustable seat belt rerouter system includes a cord, a cord length adjustment mechanism, and a shoulder belt guide. The cord, which can be an elastic cord, has a first end, a second end, and a length between the first and second ends. The cord is sufficiently resistant to elongation under typical movement of a vehicle occupant so as to hold the shoulder belt in a rerouted position away from the vehicle occupant's neck and face. The shoulder belt guide is slidingly connectable to the shoulder belt.

The adjustable seat belt rerouter system further includes two means of attachment, a means for attaching the first end of the cord to the shoulder belt guide, and a means for attaching the second end of the cord to a vehicle attachment point. When the cord first end is attached to the shoulder belt guide and the cord second end is attached to the vehicle attachment point, the cord length is adjustable for rerouting and holding the shoulder belt away from a vehicle occupant's neck and face.

The cord length adjustment means includes a cord lock having two cord passing apertures and a spring-biased locking mechanism. When the cord length is adjusted, the spring-biased locking mechanism exerts tension against the cord passing through the apertures to maintain an adjusted cord length. The cord lock includes a depressable plunger for releasing the spring-biased tension on the cord in the apertures so that the cord length can be adjusted. In embodiments, the cord lock includes a slide clamp instead of a spring-biased mechanism for locking a cord in place. The cord lock allows the cord to be fully and repeatedly adjustable for different size occupants. The cord lock is simple to operate and offers the convenience of being easily adjustable by the occupant once situated within the seat of a vehicle.

In preferred embodiments, the shoulder belt guide is C-shaped and has an inner aspect and an outer aspect. The inner aspect includes two spaced-apart prongs that define an opening for removably receiving the shoulder belt. The width of the shoulder belt guide is slightly less than the width of the shoulder belt so that when the shoulder belt is inserted through the shoulder belt guide opening, the shoulder belt is frictionally held in place by the shoulder belt guide. The difference in the widths of the shoulder belt and the shoulder belt guide is such the shoulder belt guide can be slid vertically along the shoulder belt in order to adjust the shoulder belt to a safe and comfortable position for an individual vehicle occupant. The shoulder belt guide can be easily removed from the shoulder belt for storage or use on another shoulder belt. The cord can also be disengaged from the shoulder belt guide, and the guide can be left on the shoulder belt for later use.

The shoulder belt guide further includes a hook-receiving member on the outer aspect of the shoulder belt guide. Preferably, the hook-receiving member is integrally formed with the shoulder belt guide outer aspect.

The means for attaching the first end of the cord to the shoulder belt guide includes a hook assembly. The hook assembly includes a sleeve fixedly attached to the cord first end and a hook rotatably attached to the sleeve. Once the shoulder belt guide is attached to the shoulder belt webbing, the hook can be attached to the hook-receiving member such that the rerouter system reroutes the shoulder belt to a comfortable position for the vehicle seat occupant.

In embodiments, the cord second end can be releasably attached to the vehicle attachment point. In embodiments, the cord second end includes a loop. In preferred embodiments, the vehicle attachment point is a vehicle seat headrest post. The cord is attached about the vehicle headrest post by inserting the headrest post through the loop and into a channel for receiving the headrest post. In alternative embodiments, the loop on the cord second end is looped about a button sewn to a vehicle seat.

In other embodiments, the cord second end is fixedly attached to the vehicle attachment point. For example, the cord second end can be fixedly attached to a vehicle seat by sewing the cord second end to the seat. In other embodiments, the vehicle attachment point is a portion of a vehicle body, to which the cord second end can either be releasably attached or fixedly attached.

Features of an adjustable seat belt rerouter system of the present invention may be accomplished singularly, or in combination, in one or more of the embodiments of the present invention. As will be appreciated by those of ordinary skill in the art, the present invention has wide utility in a number of applications as illustrated by the variety of features and advantages discussed below.

An adjustable seat belt rerouter system of the present invention provides numerous advantages over prior seat belt positioning devices. For example, the present invention advantageously provides a system for rerouting the shoulder belt portion of a seat belt away from an vehicle occupant's face and/or neck over the occupant's chest and shoulder that is fully adjustable for different size occupants. Such a device advantageously allows for variably adjusting seat belts to allow for rerouting shoulder belts to different positions as children grow.

Another advantage is that the present invention provides an adjustable seat belt rerouter system that offers the convenience of being easily adjustable by the occupant once situated within the seat of a vehicle.

Another advantage is that the present invention provides an adjustable device which is adaptable for use with a conventional three-point seat belt for rerouting the position of a shoulder belt so that it does not interfere with a child's face and/or neck, and which encourages a child to use his or her seat belt properly so that the full safety benefits of a Type II vehicle restraint can be realized.

Yet another advantage is that the present invention provides a shoulder belt adjustment device that, once a shoulder belt is adjusted to a desired lateral position in a three-point seat belt system, securely maintains the shoulder belt its desired position.

Yet another advantage is that the present invention provides an adjustable seat belt rerouter system that is simple to install and use and does not require substantial modification of an existing seat belt assembly in order to operate. Such a system is readily adaptable to, and usable with, existing seat belt systems, as well as ones which are likely to be developed in the future.

Still another advantage is that the present invention provides an adjustable seat belt rerouter system that is easily removable from one shoulder belt and usable with other shoulder belts. Because embodiments of an adjustable seat belt rerouter system of the present invention are completely removable, the entire assembly can be stored in a non-visible location when not in use. Moreover, an adjustable seat belt rerouter system of the present invention is sufficiently portable to allow a person to carry the system in a pocket or handbag for use on any vehicle occupied by the person.

Still another advantage is that the present invention provides an adjustable seat belt rerouter system that is easily and inexpensively manufactured from a minimum number of parts and includes readily interchangeable and replaceable parts. An adjustable seat belt rerouter system provides a construction that is reliable and durable.

As will be realized by those of skill in the art, many different embodiments of an adjustable seat belt rerouter system according to the present invention are possible. Additional uses, objects, advantages, and novel features of the invention are set forth in the detailed description that follows and will become more apparent to those skilled in the art upon examination of the following or by practice of the invention.

DETAILED DESCRIPTION

Embodiments of the present invention provide an adjustable seat belt rerouter system advantageous for adjustably rerouting a shoulder belt safely and comfortably away from a vehicle occupant's neck and face. FIGS. 1–7 show such embodiments.

Figure 1:
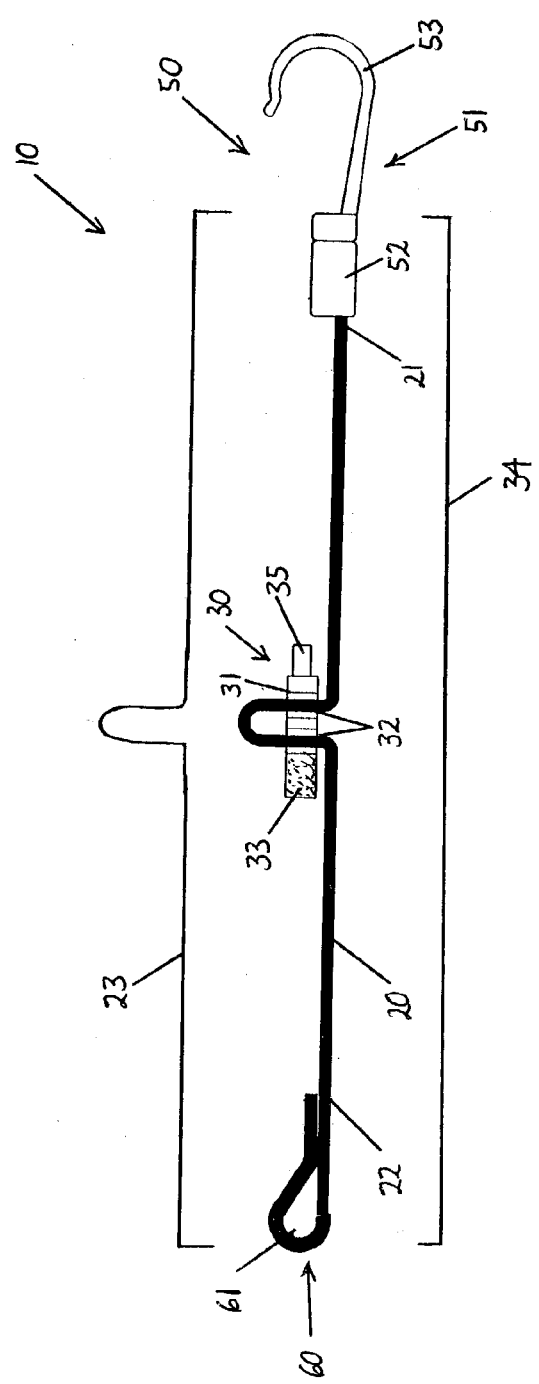
FIG. 1 is a view of an adjustable seat belt rerouter system having a looped end for attaching to a vehicle headrest post in an embodiment of the present invention.
Figure 2:
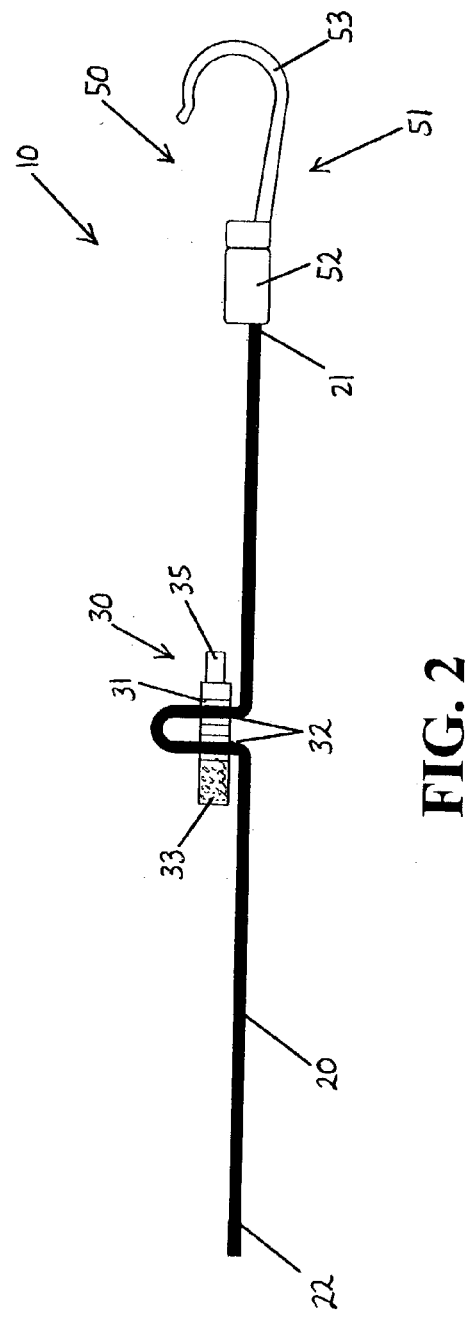
FIG. 2 is a view of an adjustable seat belt rerouter system having a straight end for sewing to a vehicle seat in an embodiment of the present invention.
Figure 3:
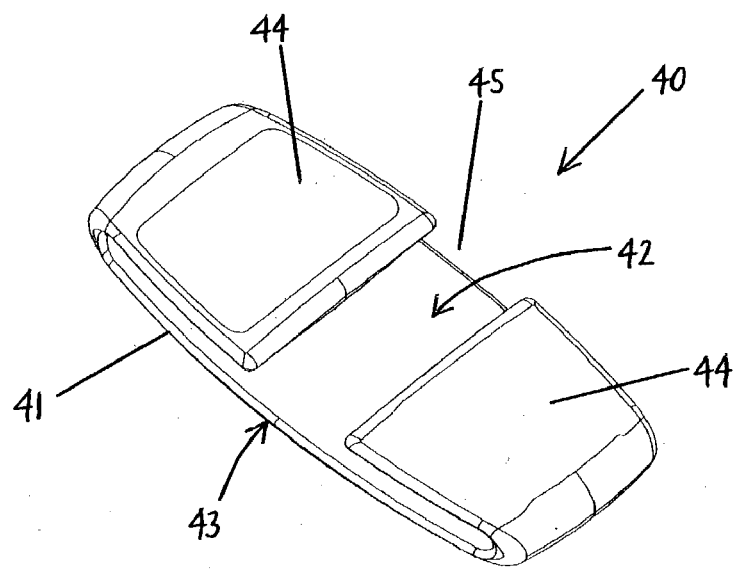
FIG. 3 is a perspective view of a shoulder belt guide in an embodiment of a an adjustable seat belt rerouter system of the present invention.
Figure 7:
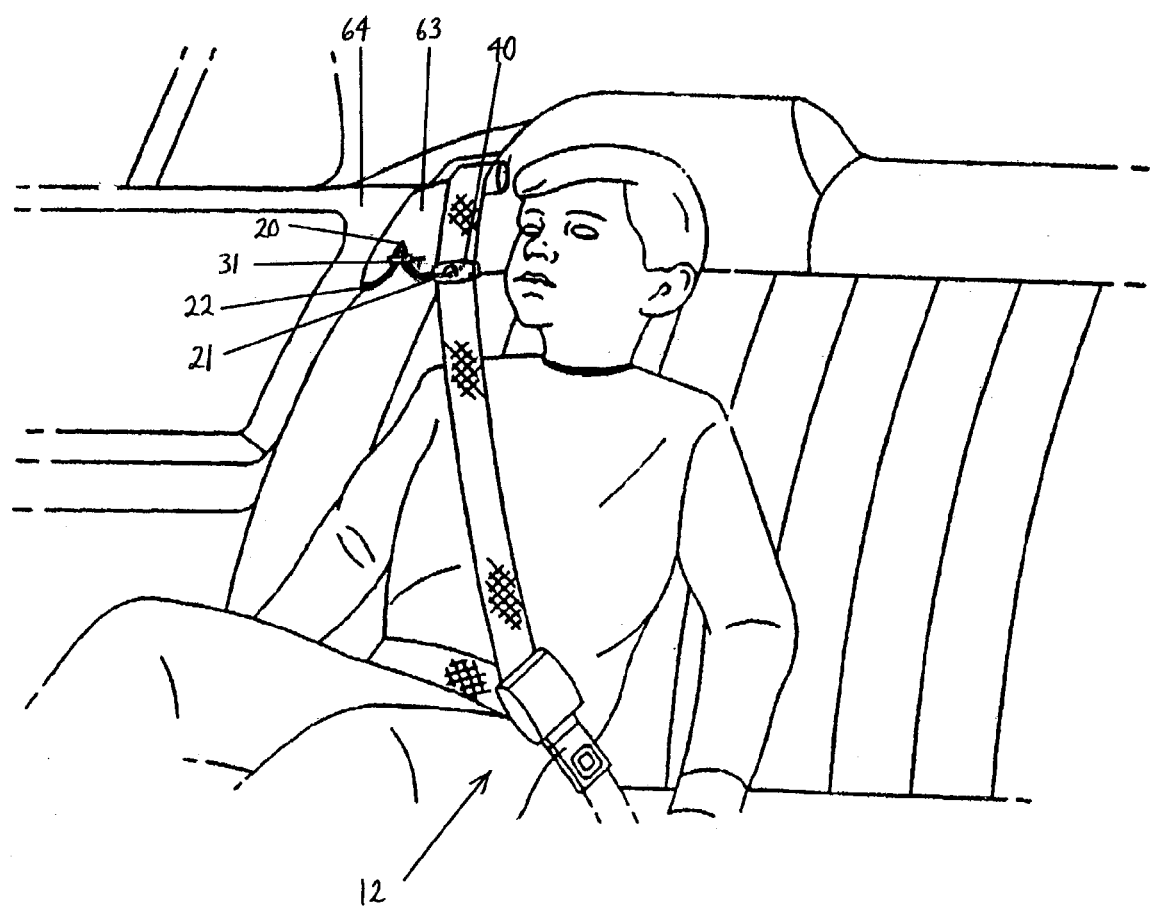
FIG. 7 is a view of an embodiment of an adjustable seat belt rerouter system of the present invention shown rerouting a shoulder belt in proper position across a child's chest and shoulder.

Referring to FIGS. 1–3, an adjustable seat belt rerouter system 10 for a shoulder belt 11 of a three-point attachment seat belt 12 (as shown in FIG. 7) includes a cord 20 having a first end 21, a second end 22, and a length 23 between the first and second ends 21, 22, respectively. The rerouter system 10 includes a cord length adjustment means 30 and a shoulder belt guide 40 slidingly connectable to the shoulder belt 11. The rerouter system 10 includes two means of attachment, a means 50 for attaching the first end 21 of the cord 20 to the shoulder belt guide 40, and a means 60 for attaching the second end 22 of the cord 20 to a vehicle attachment point. When the cord first end 21 is attached to the shoulder belt guide 40 and the cord second end 22 is attached to the vehicle attachment point, the cord length 23 is adjustable for rerouting and holding the shoulder belt 11 away from a vehicle occupant's neck and face.

The cord 20 is preferably formed of an elastic material. In alternative embodiments, the cord 20 is formed of a nonelastic material. To hold the shoulder belt 11 in a rerouted position away from the vehicle occupant's neck and face, the cord 20 is sufficiently resistant to elongation under typical movement of a vehicle occupant. In preferred embodiments, the elongation resistance of the cord 20 is a 60% elongation maximum in response to a pulling force of 10 pounds. Preferably, the cord 20 is rounded and has a diameter of 4.2 mm and a length 23 of 225 mm.

As shown in FIGS. 1 and 2, the cord length adjustment means 30 includes a cord lock 31 having two cord passing apertures 32 and a spring-biased locking mechanism 33. When the cord length 23 is adjusted, the spring-biased locking mechanism 33 exerts tension against the cord 20 passing through the apertures 32 to maintain an adjusted cord length 34. The cord lock 31 of the present invention can include a spring-biased plunger 35 similar to that of the cord lock described in U.S. Pat. No. 4,288,891 to Boden. The cord lock 31 includes a body containing a passage and a plunger 35 slidably mounted in the passage for movement relative to the body along a predetermined axis. The plunger 35 has an end portion which is accessible from the outside of the body for manually depressing the plunger 35 inwardly along the axis from a cord gripping position to a cord releasing position. A spring 33 is positioned inside the cord lock 31 body to yieldingly resist such inward axial sliding movement of the plunger 35. The spring 33 is preferably a 0.8 mm diameter steel spring and capable of cycling 10,000 times without loss of performance or degradation of the cord lock components.

The body and the plunger 35 each have two cord passing apertures 32 through which the cord 20 can extend generally transversely relative to the axis of the cord lock 31 body. The body and plunger 35 each have edges shaped to provide a gripping surface against the cord 20 portions passing through the cord passing apertures 32 such that when the plunger 35 is biased outward by the spring 33 into a gripping position, the cord 20 is locked against longitudinal movement. When the plunger 35 is depressed inwardly along the axis of the cord lock 31 body, the apertures 32 in the body and in the plunger 35 are aligned such that the cord is released for longitudinal movement. In this manner, the cord length 23 can be adjusted to the adjusted length 34 to provide rerouting of the shoulder belt 11 to a position away from the vehicle occupant's neck and/or face. The cord lock 31 can have a barrel shape, oval shape, circular shape, or other shape suitable for housing a spring-biased cord locking mechanism. Alternatively, the cord lock includes a slide clamp instead of a spring-biased mechanism for locking a cord in place.

Use of the cord lock 35 allows the cord 20 to be fully and repeatedly adjustable for different size occupants. The cord lock 31 is simple to operate and offers the convenience of being easily adjustable by the occupant once situated within the seat of a vehicle. In addition, such a cord length adjustment means 30 of the present invention advantageously allows for variably adjusting seat belts to allow for rerouting shoulder belts 11 to different positions as children grow.

Other cord lock mechanisms 30 can also provide the proper locking of the cord 20 and vary the effective length 23 of the cord 20 so that the shoulder belt 11 can be rerouted away from the neck and face of different size occupants of a vehicle. For example, cord locking mechanisms useful in the present invention are described in U.S. Pat. No. 4,156,574 to Boden, and U.S. Pat. No. 5,345,656 to Merritt.

Figure 4:
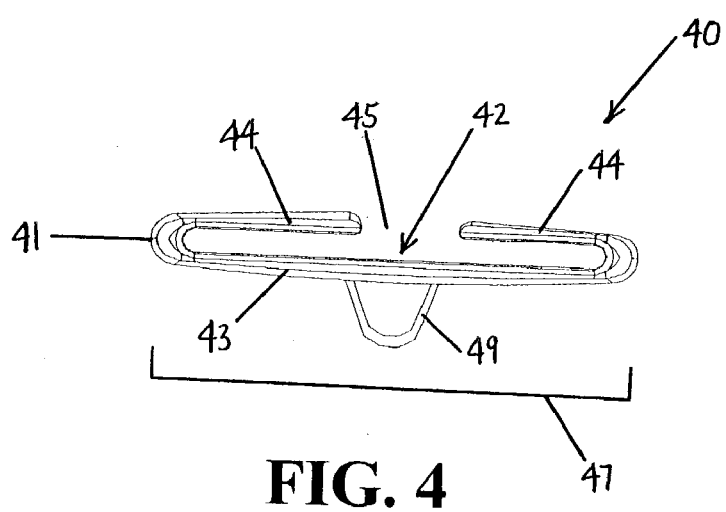
FIG. 4 is a cross-sectional view of the shoulder belt guide of FIG. 3 in an embodiment of the present invention.
Figure 5:
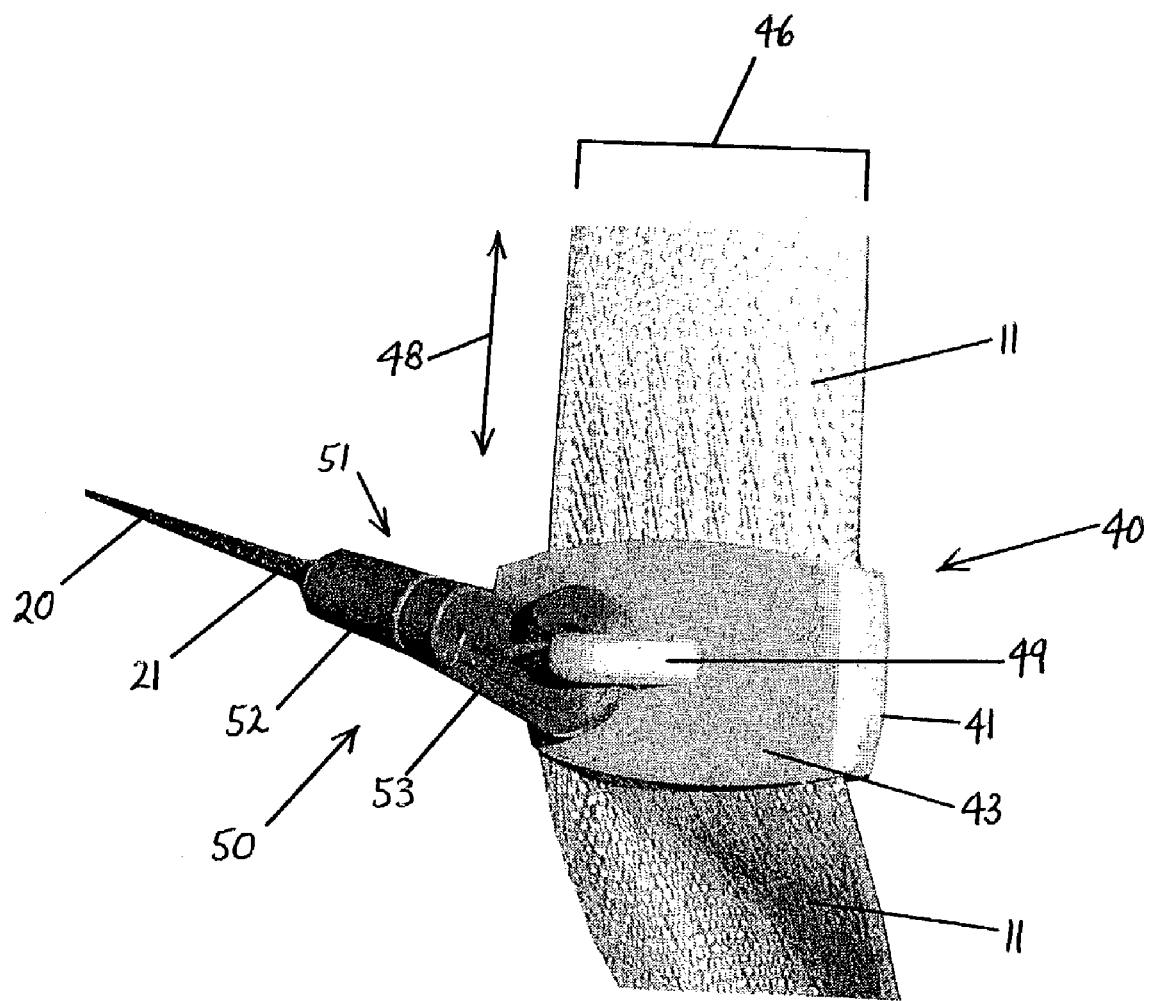
FIG. 5 is a view of a hook assembly of an adjustable seat belt rerouter system attached to the shoulder belt guide of FIG. 3 in an embodiment of the present invention.

As shown in FIGS. 3 and 4, the shoulder belt guide 40 is a C-shaped guide 41 having an inner aspect 42 and an outer aspect 43. The inner aspect 42 includes two spaced-apart prongs 44 that define an opening 45 for removably receiving the shoulder belt 11. The shoulder belt 11 has a width 46, as shown in FIG. 5, and the shoulder belt guide 40 has a width 47, as shown in FIG. 4. The width 47 of the shoulder belt guide 40 is slightly less than the width 46 of the shoulder belt 11 so that when the shoulder belt 11 is inserted through the shoulder belt guide opening 45, the shoulder belt 11 is frictionally held in place by the shoulder belt guide 40. While the shoulder belt guide 40 holds its position on the shoulder belt 11 by friction, the difference in the widths 46, 47 of the shoulder belt 11 and the shoulder belt guide 40, respectively, is such the shoulder belt guide 40 can be slid vertically (48) along the shoulder belt 11 in order to adjust the shoulder belt 11 to a safe and comfortable position for a particular vehicle occupant. The shoulder belt guide 40 can be easily removed from the shoulder belt 11 for storage or use on another shoulder belt 11. Alternatively, the cord 20 can be disengaged from the shoulder belt guide 40 and the guide 40 unobtrusively left on the shoulder belt 11 for later use.

In embodiments, the shoulder belt guide 40 is formed of an ejection-molded plastic material. In preferred embodiments, the ejection-molded plastic material comprises acrylonitrile butadiene styrene (ABS). The shoulder belt guide 40 further includes a hook-receiving member 49 on the outer aspect 43 of the shoulder belt guide 40. Preferably, the hook-receiving member 49 is integrally formed with the shoulder belt guide outer aspect 43.

As shown in FIGS. 1, 2, and 5, the means 50 for attaching the first end 21 of the cord 20 to the shoulder belt guide 40 includes a hook assembly 51. The hook assembly 51 includes a sleeve 52 fixedly attached to the cord first end 21 and a hook 53 rotatably attached to the sleeve 52. Once the shoulder belt guide 40 is attached to the shoulder belt 11 webbing, the hook 53 can be attached to the hook-receiving member 49 on the outer aspect 43 of the shoulder belt guide 40 such that the rerouter system 10 reroutes the shoulder belt 11 to a comfortable position for the vehicle seat occupant. Once the shoulder belt 11 is adjusted to a desired lateral position in a three-point seat belt system 12, the adjustable seat belt rerouter system 20 securely maintains the shoulder belt 11 its desired position.

In preferred embodiments of the present invention, the means 60 for attaching the second end 22 of the cord 20 to a vehicle attachment point includes a means for releasably attaching the second end 22. The means for releasably attaching the second end 22 may be buttons, snaps, hooks, or hook-and-loop fasteners attached to the second end 22 of the cord 20 and to the vehicle attachment point.

Figure 6:
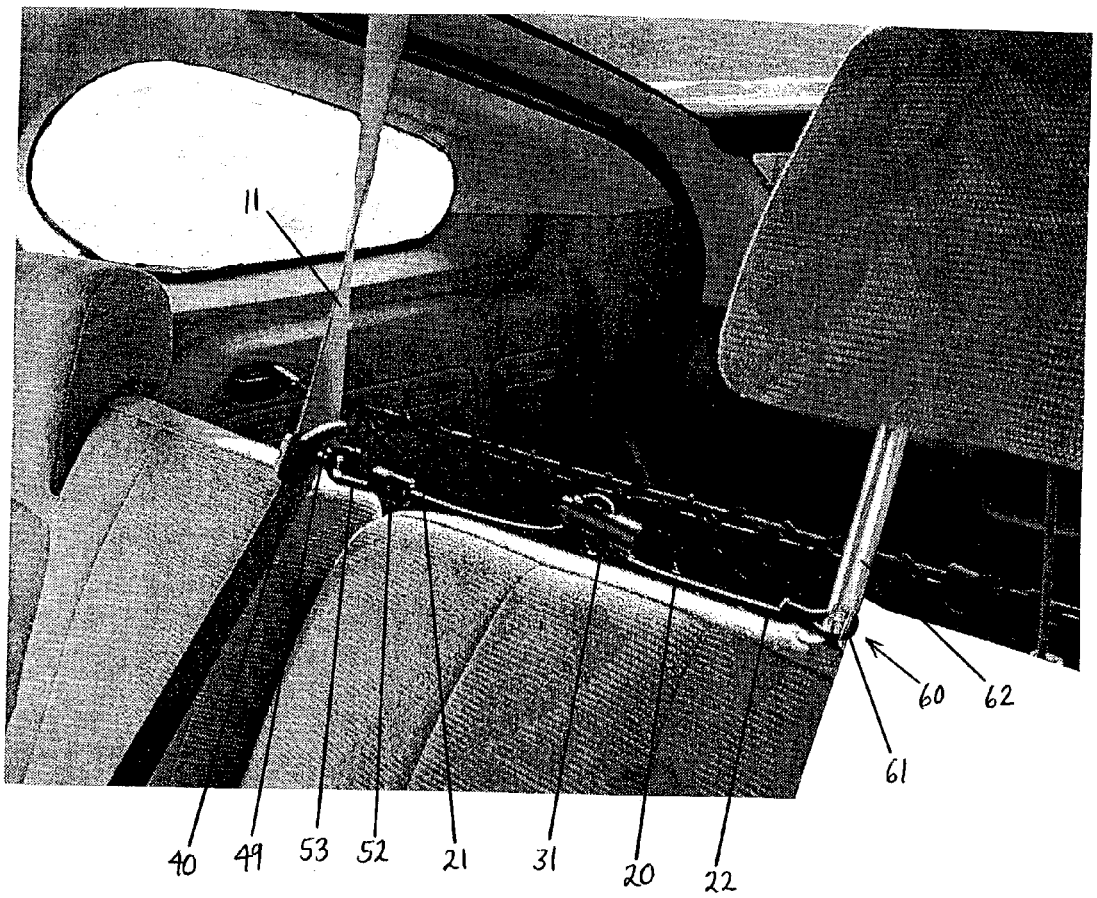
FIG. 6 is a view of an adjustable seat belt rerouter system attached to a vehicle headrest post and to a shoulder belt in an embodiment of the present invention.

In embodiments, the cord second end 22 includes a loop 61, as shown in FIGS. 1 and 6. In preferred embodiments, the vehicle attachment point is a vehicle seat headrest post 62. The cord 20 is attachable about the headrest post 62 by inserting the headrest post 62 through the loop 61 and into a channel for receiving the headrest post 62. In alternative embodiments, the loop 61 on the cord second end 22 is looped about a button (not shown) sewn to a vehicle seat 63, as shown in FIG. 7.

In embodiments, the cord second end 22 can be releasably attached to the vehicle attachment point. In other embodiments, the cord second end 22 can be fixedly attached to the vehicle attachment point. In embodiments, the cord second end 22 is fixedly attached to the vehicle seat 63 by sewing the cord second end 22 to the seat 63. In other embodiments, the vehicle attachment point is a portion of a vehicle body 64, as shown in FIG. 7. The cord second end 22 can either be releasably attached or fixedly attached to the vehicle body.

In a preferred embodiment of the present invention, an adjustable seat belt rerouter system 10 for a shoulder belt 11 of a three-point attachment seat belt 12 includes an elastic cord 20 having a first end 21, a second end 22, and a length 23 between the first and second ends. The rerouter system 10 includes a cord length adjustment means 30 comprising a cord lock 31 having two cord passing apertures 32 and a releasable spring-biased locking mechanism 33 for adjusting the cord length 23 and exerting tension against the cord 20 passing through the apertures 32 to maintain the adjusted cord length 34. A C-shaped shoulder belt guide 40 is slidingly and removably connectable to the shoulder belt 11 and has a hook-receiving member 49 attached to the outer aspect 43 of the guide 40. A hook assembly 51 includes a sleeve 52 fixedly attached to the cord first end 21 and a hook 53 rotatably attached to the sleeve 52 for releasably attaching the first end 21 of the cord 20 to the shoulder belt guide 40. The rerouter system includes a means 60 for releasably attaching the second end 22 of the cord 20 to a vehicle attachment point. When the cord first end 21 is attached to the shoulder belt guide 40 and the cord second end 22 is attached to the vehicle attachment point, the cord length 23 is adjustable for rerouting and holding the shoulder belt 11 away from a vehicle occupant's neck and face.

In this embodiment, the cord second end 22 can include a loop 61. The loop 61 can be looped a vehicle seat headrest post 62 to secure the cord 20 to the vehicle.

Although the present invention has been described with reference to particular embodiments, it should be recognized that these embodiments are merely illustrative of the principles of the present invention. Those of ordinary skill in the art will appreciate that an adjustable seat belt rerouter system of the present invention may be constructed and implemented in other ways and embodiments. For example, the size and shape of the cord lock may vary. Further, the cord may be constructed of elastic or non-elastic material. Accordingly, the description herein should not be read as limiting the present invention, as other embodiments also fall within the scope of the present invention.

What is claimed is:

1. An adjustable seat belt rerouter system for a shoulder belt of a three-point attachment seat belt, comprising:
   a cord having a first end, a second end, and a length between the first and second ends;
   a cord length adjustment means, comprising:
      a cord lock having two cord passing apertures, and
      a spring-biased locking mechanism;
   a shoulder belt guide slidingly connectable to the shoulder belt;
   a means for attaching the first end of the cord to the shoulder belt guide; and
   a means for attaching the second end of the cord to a vehicle attachment point;
   wherein when the cord first end is attached to the shoulder belt guide and the cord second end is attached to the vehicle attachment point, the cord length is adjustable for rerouting and holding the shoulder belt away from a vehicle occupant's neck and face; and
   wherein when the cord length is adjusted, the spring-biased locking mechanism exerts tension against the cord passing through the apertures to maintain the adjusted cord length.

2. The adjustable seat belt rerouter system of claim 1, wherein the cord further comprises an elastic material.

3. The adjustable seat belt rerouter system of claim 1, wherein the cord further comprises a non-elastic material.

4. The adjustable seat belt rerouter system of claim 1, wherein the cord further comprises sufficient resistance to elongation to hold the shoulder belt in a rerouted position away from the vehicle occupant's neck and face.

5. The adjustable seat belt rerouter system of claim 4, wherein the cord resistance to elongation comprises a 60% elongation maximum in response to a pulling force of 10 pounds.

6. The adjustable seat belt rerouter system of claim 1, wherein the cord lock further comprises a depressable plunger for releasing the spring-biased tension on the cord in the apertures, whereby the cord length can be adjusted.

7. The adjustable seat belt rerouter system of claim 1, wherein the shoulder belt guide further comprises a C-shaped guide having an inner aspect and an outer aspect, the inner aspect comprising two spaced-apart prongs defining an opening for removably receiving the shoulder belt.

8. The adjustable seat belt rerouter system of claim 7, the shoulder belt and the shoulder belt guide each having a width, wherein the width of the shoulder belt guide is less than the width of the shoulder belt so that when the shoulder belt is inserted through the shoulder belt guide opening, the shoulder belt is frictionally held in place by the shoulder belt guide.

9. The adjustable seat belt rerouter system of claim 7, the shoulder belt guide further comprising a hook-receiving member on the outer aspect of the shoulder belt guide.

10. The adjustable seat belt rerouter system of claim 9, wherein the hook-receiving member is integrally formed with the shoulder belt guide outer aspect.

11. The adjustable seat belt rerouter system of claim 1, wherein the shoulder belt guide is adapted to be slidingly displaced vertically along the shoulder belt in order to adjust the shoulder belt to a safe and comfortable position for the vehicle occupant.

12. The adjustable seat belt rerouter system of claim 1, wherein the shoulder belt guide comprises an ejection-molded plastic material.

13. The adjustable seat belt rerouter system of claim 12, wherein the ejection-molded plastic material comprises acrylonitrile butadiene styrene.

14. The adjustable seat belt rerouter system of claim 1, wherein the means for attaching the first end of the cord to the shoulder belt guide comprises a hook assembly.

15. The adjustable seat belt rerouter system of claim 14, wherein the hook assembly comprises a sleeve fixedly attached to the cord first end and a hook rotatably attached to the sleeve.

16. The adjustable seat belt rerouter system of claim 1, wherein the means for attaching the second end of the cord to a vehicle attachment point comprises a means for releasably attaching the second end.

17. The adjustable seat belt rerouter system of claim 16, wherein the means for releasably attaching the second end comprises buttons, snaps, hooks, or hook-and-loop fasteners.

18. The adjustable seat belt rerouter system of claim 16, wherein the cord second end further comprises a loop.

19. The adjustable seat belt rerouter system of claim 18, wherein the vehicle attachment point comprises a vehicle seat headrest post and wherein the loop on the cord second end is looped about the headrest post.

20. The adjustable seat belt rerouter system of claim 18, wherein the loop on the cord second end is looped about a button sewn to a vehicle seat.

21. The adjustable seat belt rerouter system of claim 1, wherein the vehicle attachment point comprises a vehicle body and wherein the cord second end is releasably attached to the vehicle body.

22. The adjustable seat belt rerouter system of claim 1, wherein the means for attaching the second end of the cord to a vehicle attachment point comprises a means for fixedly attaching the second end.

23. The adjustable seat belt rerouter system of claim 22, wherein the means for fixedly attaching the second end comprises the cord second end sewn to a vehicle seat.

24. The adjustable seat belt rerouter system of claim 1, wherein the vehicle attachment point comprises a vehicle body and wherein the cord second end is fixedly attached to the vehicle body.

25. An adjustable seat belt rerouter system of for a shoulder belt of a three-point attachment seat belt, comprising:
  an elastic cord having a first end, a second end, and a length between the first and second ends;
  a cord length adjustment means comprising a cord lock having two cord passing apertures and a releasable spring-biased locking mechanism for adjusting the cord length and exerting tension against the cord passing through the apertures to maintain the adjusted cord length;
  a C-shaped shoulder belt guide slidingly and removably connectable to the shoulder belt and having a hook-receiving member;
  a hook assembly comprising a sleeve fixedly attached to the cord first end and a hook rotatable attached to the sleeve for releasably attaching the first end of the cord to the shoulder belt guide; and
  a means for attaching the second end of the cord to a vehicle attachment point,
  wherein when the cord first end is attached to the shoulder belt guide and the cord second end is attached to the vehicle attachment point, the cord length is adjustable for rerouting and holding the shoulder belt away from a vehicle occupant's neck and face.

26. The adjustable seat belt rerouter system of claim 25, the shoulder belt and the shoulder belt guide each having a width, wherein the width of the shoulder belt guide is less than the width of the shoulder belt so that when the shoulder belt is connected to the shoulder belt guide, the shoulder belt is frictionally held in place by the shoulder belt guide.

27. The adjustable seat belt rerouter system of claim 25, wherein the means for attaching the second end of the cord to a vehicle attachment point comprises a means for releasably attaching the second end.

28. The adjustable seat belt rerouter system of claim 25, the cord second end further comprising a loop and the vehicle attachment point further comprising a vehicle seat headrest post, wherein the loop on the cord second end is looped about the headrest post.

29. The adjustable seat belt rerouter system of claim 25, wherein the means for attaching the second end of the cord to a vehicle attachment point comprises a means for fixedly attaching the second end.

30. An adjustable seat belt rerouter system for a shoulder belt of a three-point attachment seat belt, comprising:
  an elastic cord having a first end, a second end, and a length between the first and second ends;
  a cord length adjustment means comprising a cord lock having two cord passing apertures and a releasable spring-biased locking mechanism for adjusting the cord length and exerting tension against the cord passing through the apertures to maintain the adjusted cord length;
  a C-shaped shoulder belt guide slidingly and removably connectable to the shoulder belt and having a hook-receiving member;
  a hook assembly comprising a sleeve fixedly attached to the cord first end and a hook rotatably attached to the sleeve for releasably attaching the first end of the cord to the shoulder belt guide; and a means for releasably attaching the second end of the cord to a vehicle attachment point, wherein when the cord first end is attached to the shoulder belt guide and the cord second end is attached to the vehicle attachment point, the cord length is adjustable for rerouting and holding the shoulder belt away from a vehicle occupant's neck and face.

31. The adjustable seat belt rerouter system of claim 30, the cord second end further comprising a loop and the vehicle attachment point further comprising a vehicle seat headrest post, wherein the loop on the cord second end is looped about the headrest post.

* * * * *